(12) United States Patent
Lawall et al.

(10) Patent No.: US 7,905,547 B2
(45) Date of Patent: Mar. 15, 2011

(54) MANIPULABLE LUMBAR SUPPORT UTILIZING ACTIVE MATERIAL ACTUATION

(75) Inventors: Jennifer P. Lawall, Waterford, MI (US); Diane K. McQueen, Leonard, MI (US); Steven E. Morris, Fair Haven, MI (US); Nancy L. Johnson, Northville, MI (US); Alan L. Browne, Grosse Pointe, MI (US); Paul W. Alexander, Ypsilanti, MI (US); Gary L. Jones, Farmington Hills, MI (US); Nilesh D. Mankame, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 85 days.

(21) Appl. No.: 12/400,026

(22) Filed: Mar. 9, 2009

(65) Prior Publication Data

US 2009/0224587 A1 Sep. 10, 2009

Related U.S. Application Data

(60) Provisional application No. 61/035,005, filed on Mar. 9, 2008.

(51) Int. Cl.
*A47C 7/46* (2006.01)

(52) U.S. Cl. .................................. 297/284.4; 297/284.1

(58) Field of Classification Search .............. 297/284.1, 297/284.4, 284.5, 284.7, 284.8
See application file for complete search history.

(56) References Cited

U.S. PATENT DOCUMENTS

| 5,868,466 | A | 2/1999 | Massara et al. | |
|---|---|---|---|---|
| 2009/0218859 | A1* | 9/2009 | Lawall et al. | 297/284.1 X |
| 2010/0033002 | A1* | 2/2010 | Di Giusto et al. | 297/284.4 X |

FOREIGN PATENT DOCUMENTS

| JP | 2004-16708 A | 1/2004 |
|---|---|---|
| KR | 1998-052579 U | 10/1998 |
| WO | 95/17840 A1 | 7/1995 |

* cited by examiner

*Primary Examiner* — Rodney B White

(57) ABSTRACT

A manipulable lumbar support adapted for use with a seat upright defining a first surface condition, includes a structure disposed within the upright and presenting a first configuration, and an actuator employing an active material element configured to cause the structure to achieve a second configuration when activated.

19 Claims, 6 Drawing Sheets

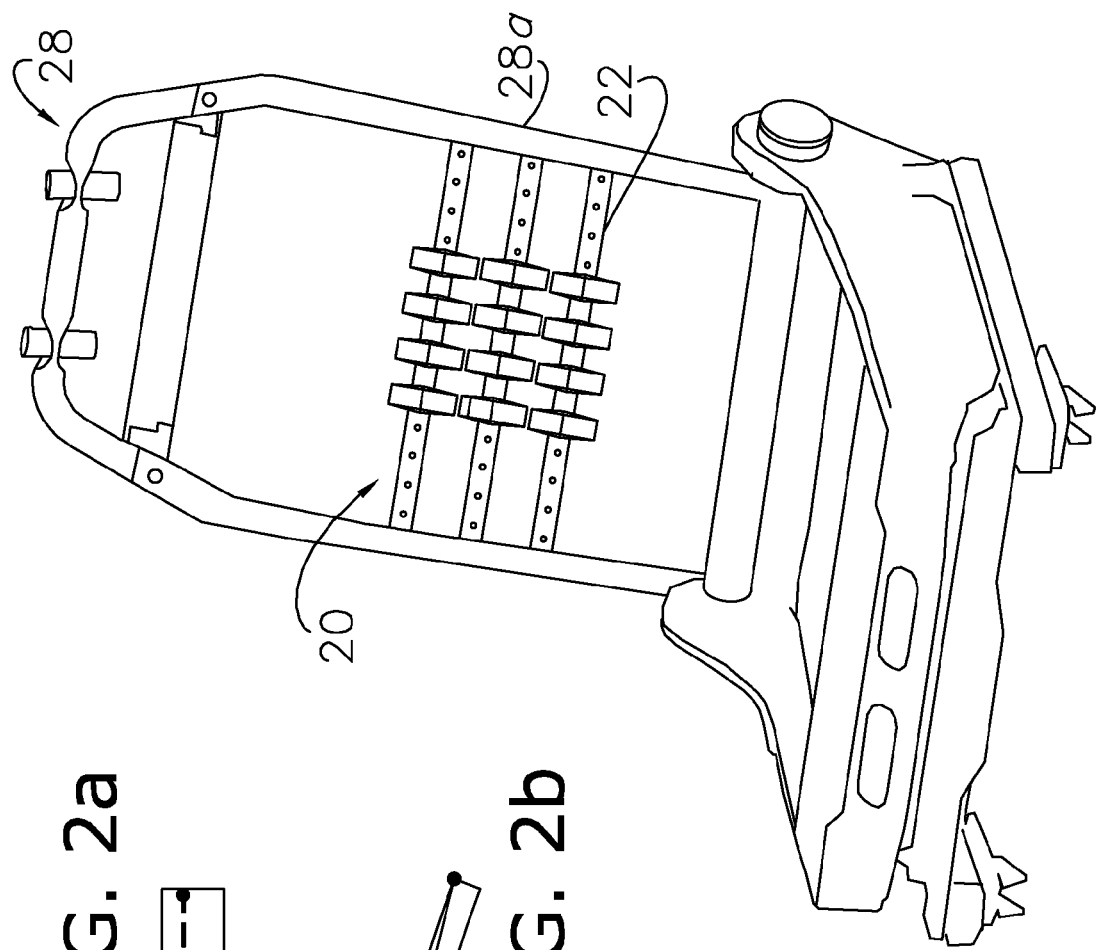
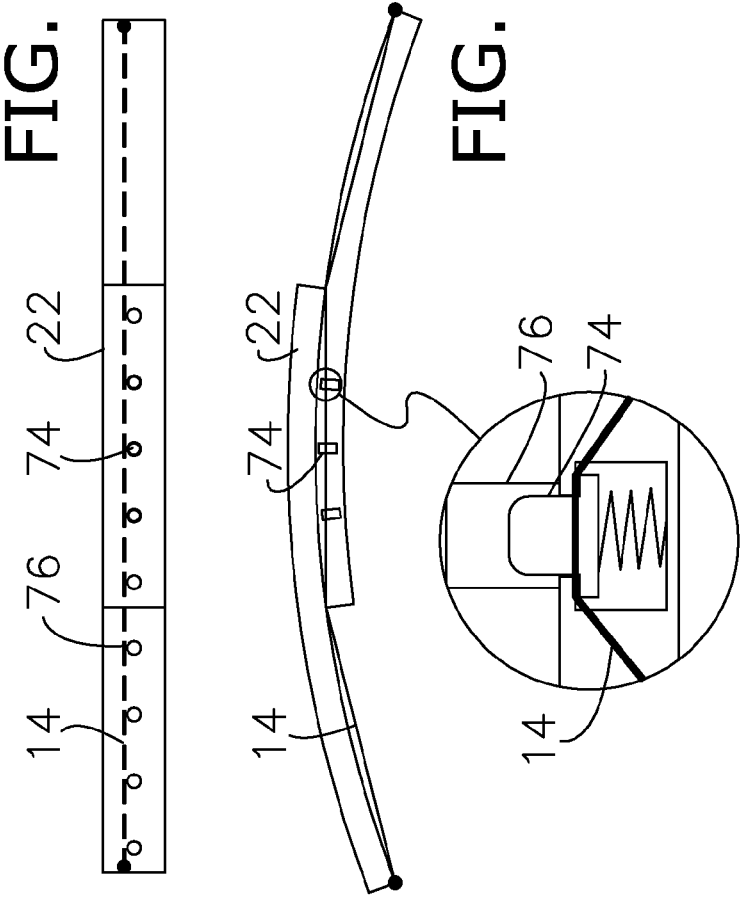
FIG. 2a
FIG. 2b
FIG. 2

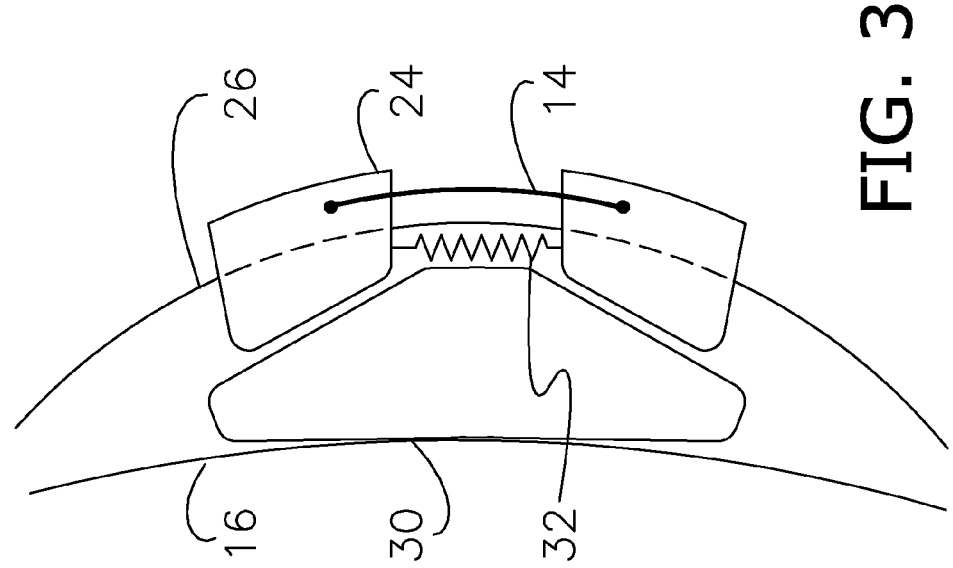
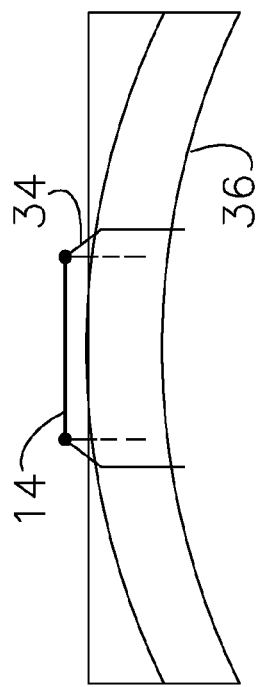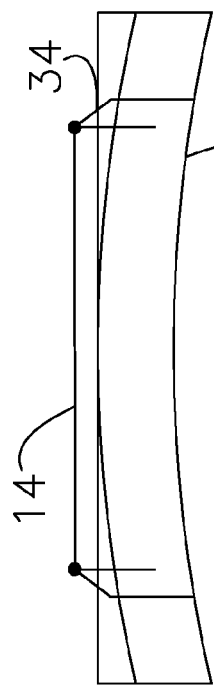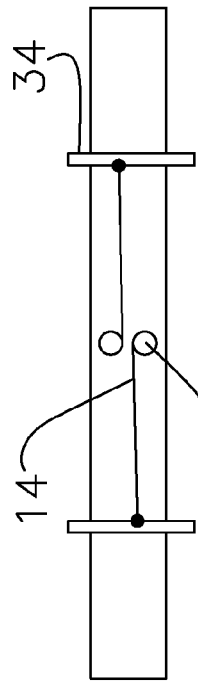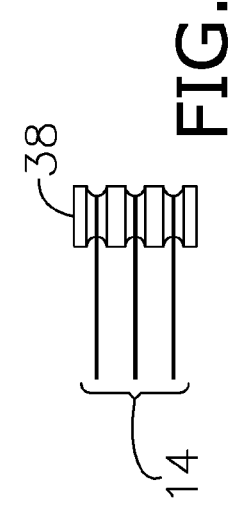

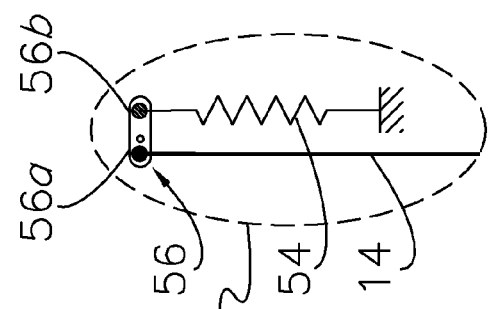
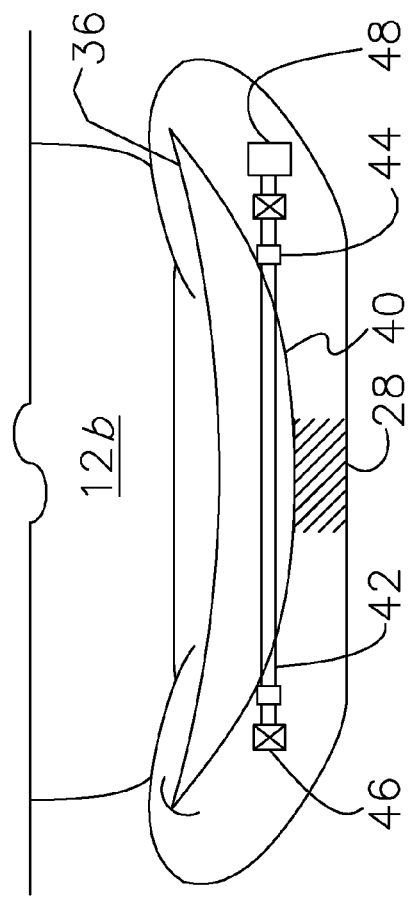
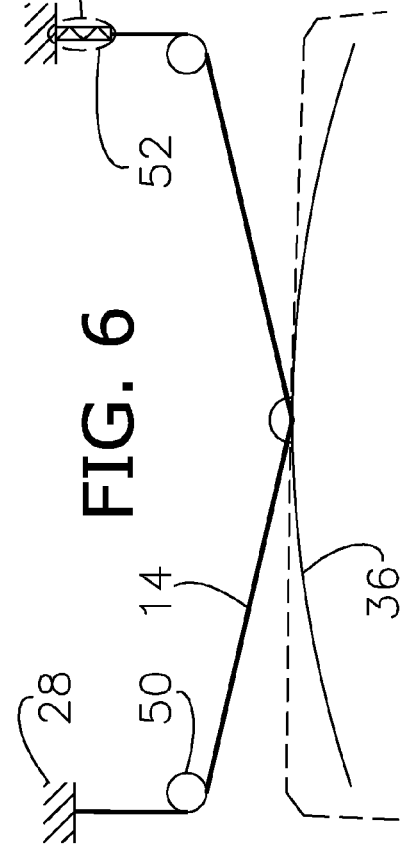
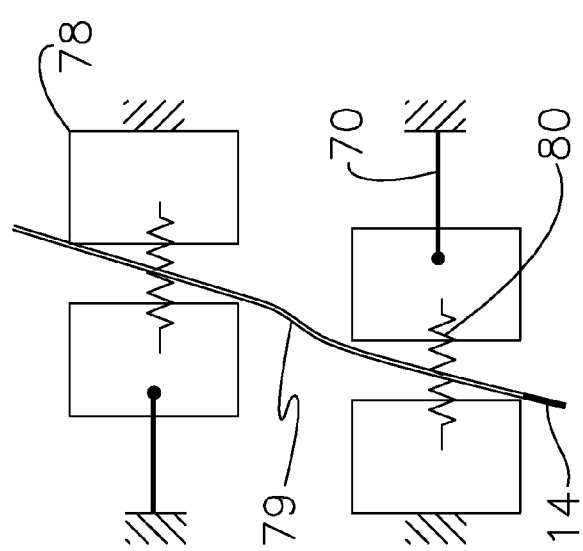

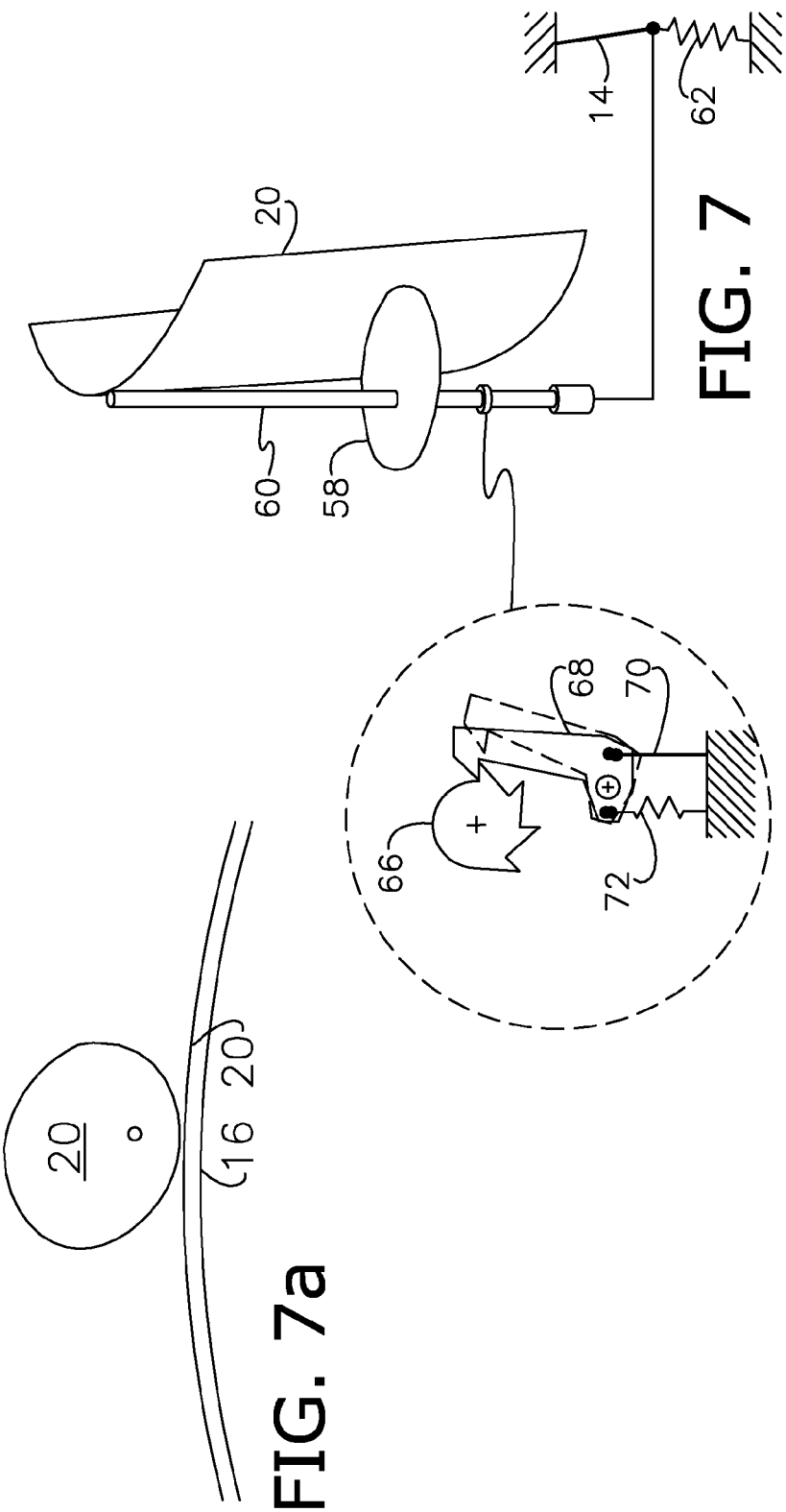
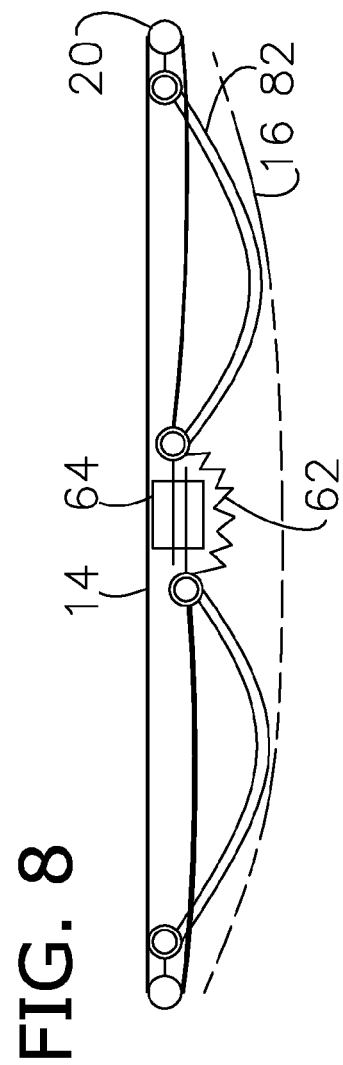
FIG. 7
FIG. 7a
FIG. 8

US 7,905,547 B2

MANIPULABLE LUMBAR SUPPORT UTILIZING ACTIVE MATERIAL ACTUATION

RELATED APPLICATIONS

This patent application claims priority to, and benefit from U.S. Provisional Patent Application Ser. No. 61/035,005, entitled "LUMBAR ACTUATION THROUGH ACTIVE MATERIALS," filed on Mar. 9, 2008, the disclosure of which is incorporated by reference herein.

BACKGROUND OF THE INVENTION

1. Field of the Invention

The present disclosure generally relates to a lumbar support adapted for use with a seat upright, and more particularly, to a manipulable lumbar support having an active material based actuator operable to change a condition of the seat upright.

2. Discussion of Prior Art

Lumbar supports are incorporated within seat uprights to provide structural capacity and support to an occupant. In an automotive setting, for example, lumbar supports typically include a plurality of spring-tensioned cross-members that straddle the lateral upright rails of the seat frame. Though flexible, conventional lumbar supports typically present one-size-fits-all configurations that may cause concerns for occupants of variable size and preference. As a result, manipulable lumbar supports have been developed in the art; however, these types of lumbar supports have achieved minimal application and use due in part to the employment of complex mechanical, electro-mechanical (e.g., motors, solenoids, etc.), pneumatic/hydraulic (e.g., bladders, air-cylinders, etc.), and manual actuators.

BRIEF SUMMARY OF THE INVENTION

The present invention addresses these concerns, and recites a manipulable lumbar support that utilizes active material actuation. The invention is useful for improving occupant kinematics, ergonomics, and comfort by providing a seat upright that is adjustable according to the size or preference of the occupant. In a preferred embodiment, the inventive lumbar support presents a massaging functionality. Finally, in an automotive setting, this invention further provides a means for changing the distribution of the forces acting on and thus the kinematics of belted occupants during impact events.

In general, a manipulable lumbar support is adapted for use with a seat upright defining an engagement surface presenting a first condition. The support includes a reconfigurable structure disposed within the upright, and presenting a first position, configuration, and orientation relative to the surface. An actuator is drivenly coupled to the structure and includes at least one active material element. The element is configured to cause or enable the structure to achieve a second position, configuration, or orientation, wherein the condition is modified, as a result of the change.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 2 is a perspective view of a seat frame and manipulable lumbar support comprising a plurality of sets of overlapping stirrups 22 laterally extending across the upright frame, in accordance with a preferred embodiment of the invention;

FIG. 2a is a front elevation of a set of stirrups 22 shown in FIG. 2, particularly illustrating a shape memory alloy wire actuator, in accordance with a preferred embodiment of the invention;

FIG. 2b is a top elevation of the set of stirrups 22 shown in FIG. 2a, particularly illustrating a ball-detent locking mechanism and single wire for actuating and releasing the mechanism, in accordance with a preferred embodiment of the invention;

FIG. 3 is a top elevation of a manipulable lumbar support including first and second sliding blocks interconnected and drivenly coupled by a shape memory wire and biasing spring antagonistic to the wire, and a floater pad engaged by the blocks, in accordance with a preferred embodiment of the invention;

FIG. 4 is a front elevation of a manipulable lumbar support including a flexed panel, first and second sliders engaging the panel, and a shape memory wire actuator interconnecting and drivenly coupled to the sliders, in accordance with a preferred embodiment of the invention;

FIG. 4a is a front elevation of the support shown in FIG. 4, wherein the sliders have been actuated;

FIG. 4b is a rear elevation of a manipulable support shown in FIG. 4, wherein the sliders are drivenly coupled to first and second wire actuators and entraining posts, in accordance with a preferred embodiment of the invention;

FIG. 4c is an elevation of plural wire actuators being entrained by a single post, in accordance with a preferred embodiment of the invention;

FIG. 5 is a top view of a seat upright and manipulable lumbar support including a resistively flexible panel structure presenting a downwardly bowed configuration and co-extending with the base, and an SMA driven screw actuator having moveable pusher nuts that further bow the structure as they translate, in accordance with a preferred embodiment of the invention;

FIG. 6 is a top view of a manipulable lumbar support including a flexible panel, bow-string wire actuator, and in enlarged caption view an overload protector, in accordance with a preferred embodiment of the invention;

FIG. 6a is an elevation of a dual block locking mechanism configured to engage and remove slack in a wire actuator, such as shown in FIG. 6, in accordance with a preferred embodiment of the invention;

FIG. 7 is an elevation of a manipulable lumbar support including a vertical torsion bar, cam, and shape memory wire actuator, in accordance with a preferred embodiment of the invention;

FIG. 7a is a top view of the cam shown in FIG. 7, engaging the surface of a seat upright;

FIG. 8 is a top view of a manipulable lumbar support including first and second flexible members drivenly coupled to and reconfigurable by a single shape memory wire actuator, wherein the actuator includes a return spring and locking mechanism, in accordance with a preferred embodiment of the invention;

DETAILED DESCRIPTION OF THE INVENTION

Figure 1:
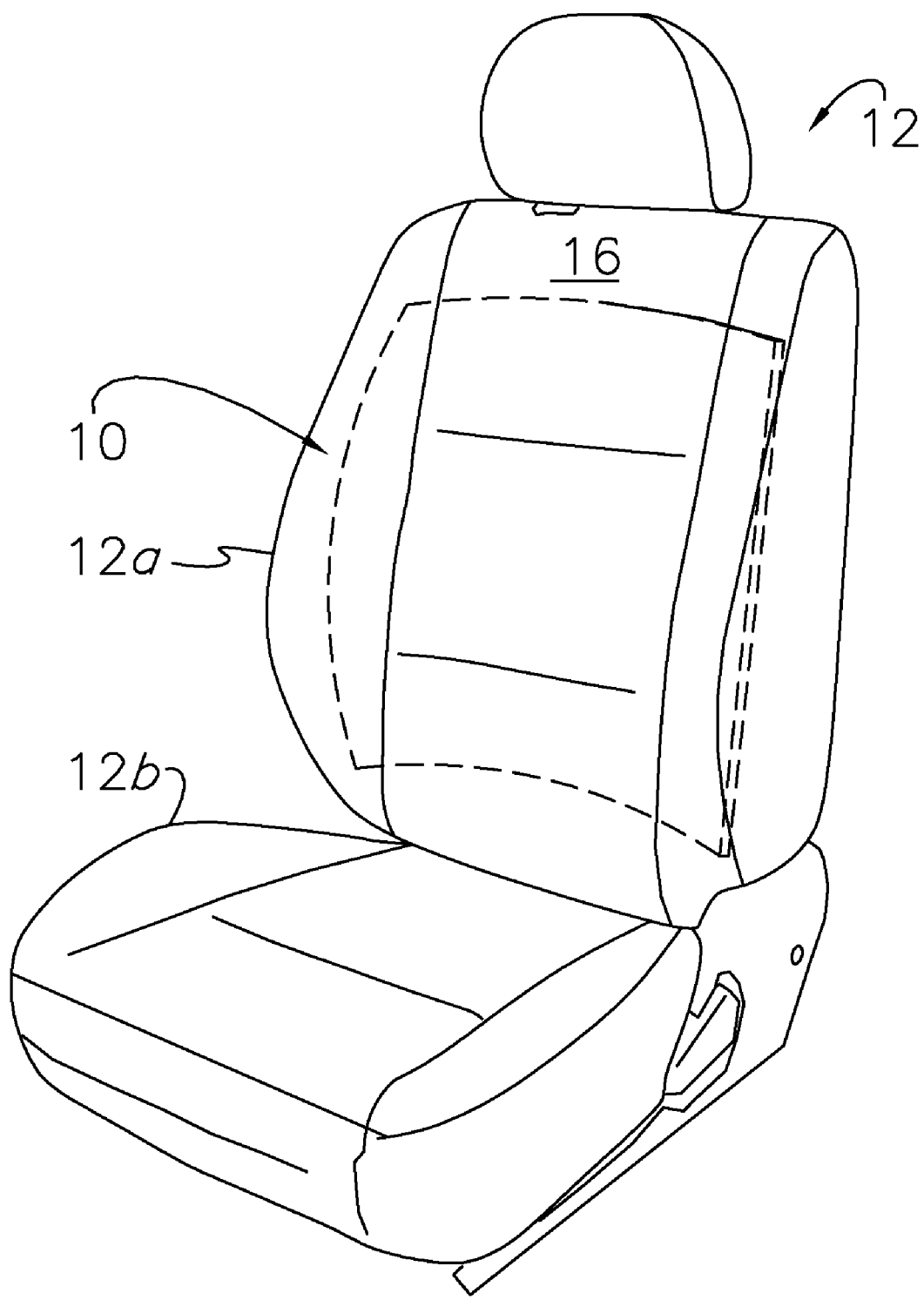
FIG. 1 is a perspective view of an automotive seat having an upright and base, particularly illustrating a manipulable lumbar support disposed with the upright, in accordance with a preferred embodiment of the invention.

The following description of the preferred embodiments is merely exemplary in nature and is in no way intended to limit the invention, its application, or uses. The invention is described and illustrated with respect to an automotive seat (FIGS. 1-10*a*); however, it is well appreciated that the benefits of the invention may be utilized variously with other types of seats (or furniture), including reclining sofas, airplane seats, and child seats. The invention general recites a manipulable lumbar support system (i.e., "support") 10 adapted for use with a seat 12 comprising an upright 12*a* and base 12*b* (FIG. 1). The support 10 is drivenly coupled to, so as to be causable to change in geometric configuration (or orientation, etc.) by, an active material element 14 able to rapidly generate measurable displacement.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, ferromagnetic shape memory alloys, shape memory polymers, electroactive polymers (EAP), and piezo-electric ceramics. As it is appreciated that these types of active materials have the ability to rapidly displace, or remember their original shape and/or elastic modulus, which can subsequently be recalled by applying an external stimulus. As such, deformation from the original shape is a temporary condition. In this manner, an element composed of these materials can change to the trained shape in response to either the application or removal (depending on the material and the form in which it is used) of an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force if it is judged that there is a need to reset the device.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudoplastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Stress induced phase changes in SMA, caused by loading and unloading of SMA (when at temperatures above $A_f$), are, however, two way by nature. That is to say, application of sufficient stress when an SMA is in its austenitic phase will cause it to change to its lower modulus martensitic phase in which it can exhibit up to 8% of "superelastic" deformation. Removal of the applied stress will cause the SMA to switch back to its austenitic phase in so doing recovering its starting shape and higher modulus.

Ferromagnetic SMA's (FSMA's) are a sub-class of SMAs. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. With respect to the present invention, it is appreciated that electroactive polymers may be fabricated and implemented as a thin film defining a preferred thickness below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Finally, it is appreciated that piezoelectric ceramics can also be employed to produce force or deformation when an electrical charge is applied. PZT ceramics consist of ferroelectric and quartz material that are cut, ground, polished, and otherwise shaped to the desired configuration and tolerance. Ferroelectric materials include barium titanate, bismuth titanate, lead magnesium niobate, lead metaniobate, lead nickel niobate, lead zinc titanates (PZT), lead-lanthanum zirconate titanate (PLZT) and niobium-lead zirconate titanate (PNZT). Electrodes are applied by sputtering or screen printing processes, and then the block is put through a poling process where it takes on macroscopic piezoelectric properties. Multi-layer piezo-actuators typically require a foil casting process that allows layer thickness down to 20 µm. Here, the electrodes are screen printed, the sheets laminated, and a compacting process increases the density of the green ceramics and removes air trapped between the layers. Final steps include a binder burnout, sintering (co-firing) at temperatures below 1100° C., wire lead termination, and poling.

Returning to FIGS. 1-10a, the manipulable lumbar support 10 is shown employed by an automotive seat upright 12a that defines an exterior engagement surface 16 (FIG. 1). The support 10 includes an actuator 18 operable to autonomously change a condition, such as the geometric configuration or stiffness of the surface 16.

In FIGS. 2-2b, the support 10 includes a moveable structure (or "panel") 20 disposed within the upright 12a. The structure 20 is formed of material sufficient to support the resting load of an occupant, as readily determinable by those of ordinary skill in the art. The structure 20 may be enveloped by a cushion layer (e.g., padding) and conformable outer covering, or may be integrally formed therewith, and is able to be linearly or rotationally moved, reconfigured, shifted, etc. between first and second positions (e.g., shapes, configurations, orientations, etc.) relative to the surface 16. Each position is preferably operable to modify the existing condition of the surface 16.

As previously mentioned, the actuator 18 includes an active material element 14 operable to undergo a reversible change in fundamental property when exposed to or occluded from an activation signal. Among other things, the element 14 may be comprised of shape memory alloy, electro-active polymers, piezoelectric composites, magneto-restrictive, electro-restrictive material or a combination of the foregoing materials. The element 14 presents sufficient actuation force to cause the support 10 to move, reposition, or reconfigure when activated, and may be configured to directly or indirectly drive manipulation. In wire form, it is appreciated that the gauge, cross-sectional area, length, and/or otherwise configuration of the element 14 necessary to effect the actuation force, based on the active material employed, is readily determinable by those of ordinary skill in the art, and as such, the selection criteria will not be described in detail herein. For example, in FIGS. 2-4, 6-8 and 10, actuator 18 is shown generally consisting of a linearly acting SMA wire 14, wherein the term "wire" is used in a non-limiting sense, and encompasses other equivalent geometric configurations such as bundles, braids, cables, ropes, chains, strips, etc.

Figure 9:
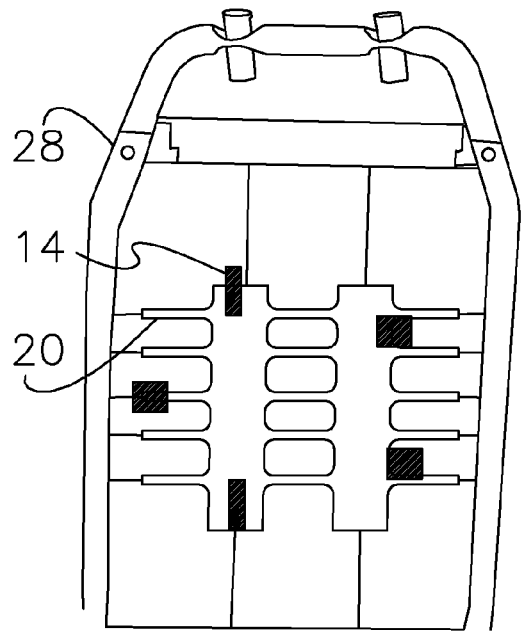
FIG. 9 is an elevation of a seat upright frame and manipulable lumbar support including a structure, and plurality of piezoelectric elements engaging the structure, in accordance with a preferred embodiment of the invention.

For tailored force and displacement performance, the actuator 18 may include a plurality of active material elements 14 configured electrically or mechanically in series or parallel, and mechanically connected in telescoping, stacked, or staggered configurations (FIG. 9). The electrical configuration may be modified during operation by software timing, circuitry timing, and external or actuation induced electrical contact.

More particularly, in a first embodiment, the structure 20 includes at least one set of lateral stirrups 22 presenting a longitudinally overlapping area in a first cooperative configuration. As shown in FIGS. 2-2b, the actuator 18 is drivenly coupled to the stirrups 22 and configured to cause them to inwardly translate to a second cooperative configuration, wherein the area is increased. The stirrups 22 are preferably bowed (FIG. 2b), so as to present a spring bias towards the outward configuration, and may be stationary or vertically translatable. Moreover, it is appreciated that first and second sets of stirrups 22 may be orthogonally oriented, and drivenly coupled to separate actuators 18, so as to present four-way adjustability.

In another embodiment shown in FIG. 3, the structure 20 includes first and second sliding blocks 24 entrained by a lateral member 26 of the upright frame 28, shown curved. The blocks 24 define a spacing, and a floater pad 30 is positioned intermediate the surface 16 and blocks 24. The actuator 18 is operable to cause the blocks 24 to relatively translate so as to define a second spacing, and the second spacing causes the pad 30 to modify the condition. For example, as shown in FIG. 3, activation of the wire 14 will cause the blocks 24 to travel inward, which causes the floater pad 30 to protrude towards the surface 16. As also shown, the blocks 24 are preferably biased towards the first or second spacing by at least one compression (or extension) spring 32.

In a second embodiment, the actuator 18 includes first and second sliders 34 (FIGS. 4-4c) entraining at least one flexible member 36, such as a normally bowed wire frame as shown. The sliders 34 may be drivenly coupled to at least one shape memory wire 14, such that the sliders 34 are caused to relatively translate, when the wire 14 is activated. The member 36 is enabled to achieve a second more bowed configuration as a result of an inward translation. As shown in FIGS. 4b,c, the sliders 34 may be drivenly coupled to a plurality of separately activated shape memory wires 14, so as to cooperatively present a plurality of support positions. Here, the sliders 34 are preferably able to be separately caused to translate. FIG. 4c shows three wire actuators 14 (wherein the middle is connected to both sliders 34) being entrained by a single post 38, such that four positions are achievable, wherein one is presented by all three wires 14 being in a deactivated or relaxed state.

Similarly, and as shown in FIG. 5, a bent sheet 40 spanning a majority of the width the upright may be secured in a first position by a screw actuator 18 and medially anchored to the seat frame 28. The sheet 40 drives the flexible member 36, which is intermediate the sheet/actuator and surface 16. More particularly, the actuator 18 includes a screw rod 42, first and second pusher nuts 44, preferably at least one bearing 46 attached to the seat frame 28, and an active material (e.g., SMA) based drive 48. The drive 48 is configured to selectively cause the rod 42 to rotate when activated, and may employ spooled SMA, a plurality of synchronous PZT's, etc. Alternatively, the screw 18 may be manually driven by the occupant, wherein the SMA element 14 assists this motion by contributing to the bowing of the flexed member 36. The nuts 44 are externally disposed adjacent the sheet 40 where they present hard stops that prevent the sheet 40 from straightening. When rotated the rod 42 causes the nuts 44 to either inwardly or outwardly translate relative to the centerline of the upright 12a. This causes the sheet 40 to further bow or straighten, thereby allowing the surface 16 to be recessed or stiffen, respectively. Finally, it is appreciated that an additional active material element, such as a shape memory wire spanning the bent sheet, may be provided to assist the drive to cause the curvature of the sheet 40.

In another example, the actuator 18 includes a shape memory alloy wire 14 medially coupled to a flexible member 36, and preferably wrapped around first and second laterally spaced pulleys 50, so as to increase the wire length (FIG. 6). When the wire 14 is caused to contract, the center of the member 36 is caused to recess; it is appreciated that the member 36 may be fixed (to the vertical rails of the upright frame 28) or free at its distal edges. As shown in FIG. 6, the wire 14 is connected to fixed anchor, such as the seat frame 28, and forms a vertex and bow-string configuration with the member 36. In this configuration, it is appreciated that wire activation results in amplified displacement at the vertex due to the trigonometric relationship presented. An alternative configuration is shown in hidden-line type (FIG. 6), wherein the wire 14 is fore a normally bowed member 36; here, activation causes the member 36 to straighten and the surface 16 to stiffen.

Also shown in FIG. 6, the actuator 18 further may, but not necessarily, include an overload protector 52 connected to the element 14 opposite the structure 20. The overload protector 52 is configured to present a secondary output path, when the element 14 is activated but the structure 20 is unable to be moved. In the illustrated embodiment, the overload protector 52 includes an extension spring 54 connected in series to the element 14. The spring 54 is stretched to a point where its applied preload corresponds to the load level where it is appreciated that the actuator element 14 would begin to experience excessive force if blocked. As a result, activation of the element 14 will first apply a force trying to manipulate the structure 20, but if the force level exceeds the preload in the spring 54 (e.g., the support 10 is blocked), the wire 14 will instead further stretch the spring 54, thereby preserving the integrity of the actuator 18.

The preferred protector 52 provides mechanical advantage, and to that end, may further include a lever 56 intermediate the element 14 and spring 54 (FIG. 6). The lever 56 defines first and second arms 56a,b and a pivot axis. The element 14 is attached to one of the arms 56a,b, so as to be spaced from the axis a first distance. The spring 54 is attached to the other arm and spaced from the axis a second distance greater than the first, so as to increase the overload force required to further stretch the spring 54.

In yet another example, shown in FIG. 7, the actuator 18 may include a cam 58 configured to selectively engage the surface 16. More particularly, the active material element 14 is operable to cause the cam 58 to rotate when activated, and the rotation of the cam 58 causes the structure 20 to achieve the second configuration. The preferred actuator 18 further includes a torsion bar 60 entraining, so as to define a pivot axis with, the cam 58 (FIG. 7). The bar 60 is fixedly connected to an upper cross-bar of the upright frame 28, so as to generate a biasing force towards the first configuration, when the cam 58 is rotated. In this regard, the actuator 18 further presents a stored energy element intermediate the active material element 14 and structure 20 (FIG. 7). The stored energy element is operable to release stored energy when the active material element 14 is activated. In these configurations, activation of a separate active material element functions to release or unlock the structure 20, e.g., so as to allow its rotation by the actuator 18.

It is appreciated that return of the structure 20 may be passively effected, e.g., by manual manipulation, or the resting load of the occupant, when the material has become deactivated; or actively, by a two-way shape memory element 14. Where the element 14 presents one-way actuation, however, a separate return mechanism (i.e., "return") 62 is preferably provided to generate a biasing force towards return. Thus, the return mechanism 62 is also drivenly coupled to the structure 20, and acts antagonistically to the actuator 18. As shown in the illustrated embodiment, the return 62 may be embodied by a compression, extension, or torsion spring, elastomer, pneumatic/hydraulic springs, elastomeric components and an additional active material element, or the like.

For example, in FIGS. 3 and 7, the return mechanism 62 is a compression and extension spring (as an addition to the torsion bar), respectively. The extension spring 62 is drivenly coupled to a structure member fixedly connected to the torsion bar 60. When the actuator 18 causes the structure 20 to swing in a first direction, the spring 62 is caused to store energy by stretching. Thus, the actuation force generated by the element 14 is greater than the elastic restoring force of the spring 62 and the restoring force or torque produced by any other energy storage element present in the system e.g. the torque produced by the torsion bar in FIG. 7. Upon deactivation (and release), the restoring force produced by the spring 62 and restoring force or torque produced by any other energy storage elements in the system such as the torsion bar in FIG. 7 overcome the inelastic resisting force of the deactivated wire 14, such that it causes the wire 14 to stretch and the structure 20 to swing back towards the original position. Here, it is appreciated that the stress experienced by the wire 14 during this reset process accelerates phase transformation back to the martensitic state.

As previously mentioned, the preferred system 10 includes a zero-power hold locking mechanism 64 coupled to the actuator. The locking mechanism 64 holds the structure 20 in the manipulated position, even after the actuator element 14 is deactivated. As previously mentioned, where stored energy actuation is employed, the locking mechanism 64 works to retain the structure 20 in the normal position, and functions as the release to actuation.

In FIG. 7, the locking mechanism 64 includes a "toothed" gear 66 concentrically aligned with the torsion bar 60, and axis. A pawl 68 is operable to selectively engage the gear 66, so as to prevent relative motion. An active material element 70 (e.g., SMA wire) is connected to the pawl 68 and configured to cause the pawl 68 to disengage the gear. Finally, a pawl return (e.g., an extension, compression, or torsional spring, etc.) 72 functions antagonistically to the disengaging element 70, so as to bias the mechanism 64 towards the engaged position.

Referring back to FIG. 2b, the locking mechanism 64 may include at least one ball 74 and detent 76 configured to engage, so as to retain, the stirrups 22 in the second configuration. Here it is appreciated that a single shape memory wire 14 may be configured to disengage the mechanism 64, and actuate the support during a thermal cycle. As shown in caption view, the wire 14 accomplishes this by first contracting to pull the ball 74 downward and then further to pull the stirrups 22 inward; thus, the wire 14 is laced within a passageway defined by the stirrups 22 (e.g., series of through-holes defined by the ball-detents). Alternatively, separate SMA wires may be used to release the detent and to change the position of the stirrups.

In yet another alternative, the locking mechanism 64 may include first and second displaceable blocks 78, as shown in FIG. 6a. The blocks 78 are configured to selectively engage the wire 14. More preferably, in this configuration, the wire 14 includes a passive section 79 of high yield capacity (e.g. a steel or kevlar rope) that engages the blocks 78. On opposite sides, the section 79 connects to the output load, and SMA wire 14. The structure 20 is resultantly retained in the second configuration, even where the wire 14 returns to its deactivated length. Finally, at least one extension spring 80 is provided to bias the blocks 78 towards engagement with the wire 14 (FIG. 6a).

FIG. 8 shows another example of the manipulable lumbar support 10 that includes first and second flexible members 82 (e.g., hinged-hinged or hinged-fixed flexed metal plate bent into an arch) drivenly coupled to and reconfigurable by a single shape memory wire 14. The members 82 are fixed at their outer ends to fixed structure, such as the vertical rails of the upright frame 28. When caused to further bow, by activation of the wire 14, the members 82 engage the surface 16 so as to modify the condition. The actuator 18 preferably further includes a return extension spring 62 and ball-detent locking mechanism 64 as previously discussed. Here, the locking mechanism 64 also serves as a guide. Finally, it is appreciated that a single wire actuator 18 may be used to unlatch and actuate.

In another aspect of the invention, the actuator 18 may include a plurality of autonomously functioning elements 14, wherein each element 14 is drivenly coupled to a separate portion/member of the structure 20. The elements 14 are cooperatively configured to sequentially displace the portions in a controlled or random pattern. In FIG. 9, for example, a flexible structure 20 is drivenly coupled to a plurality of piezoelectric elements 14, and the elements 14 and structure 20 are cooperatively configured to produce a standing or traveling wave in the surface 16. The structure 20 is preferably configured to amplify and attenuate the wave. In this configuration, it is appreciated that software or circuitry timing can be used to coordinate the elements 14.

Figure 10:
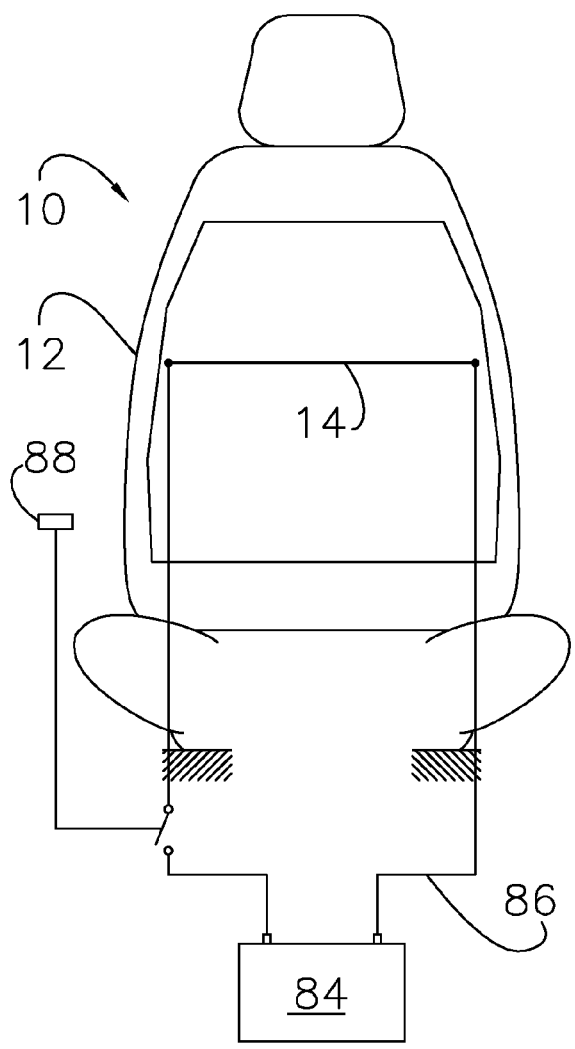
FIG. 10 is a front elevation of the seat, and support shown in FIG. 1, further illustrating a power supply and input device communicatively coupled thereto, in accordance with a preferred embodiment of the invention.
Figure 10A:
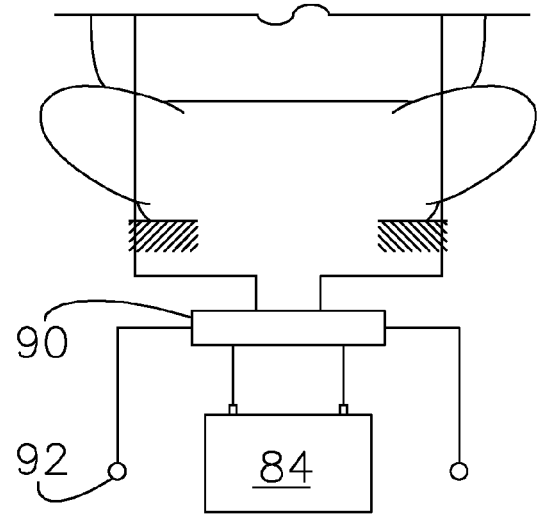
FIG. 10*a* is a partial front elevation of the support shown in FIG. 10, wherein the input device has been replaced by a controller and first and second sensors, in accordance with a preferred embodiment of the invention.

Turning to FIGS. 10 and 10*a*, it is appreciated that a signal source 84 (e.g., power supply) is communicatively coupled to the element 14 and operable to generate a suitable activation signal to activate the element 14. For example, where a Joule heating signal is to be applied in an automotive setting, the source 84 may consist of the charging system of a vehicle, including the battery, and the element 14 may be interconnected thereto, via leads 86, or through suitable short-range wireless communication (e.g., RF, etc.). Alternatively, the source 84 may include a capacitor fed by a low current supply, e.g., a plurality of piezoelectric elements operatively positioned relative to the surface 16, so as to be self-contained. Though fed over an extended period, the capacitor is operable to rapidly release sufficient current for actuation. A switch or otherwise input device 88 communicatively coupled to the element 14 and source 84 (FIG. 10) may be used to close the circuit, resulting in the activation of the associated element.

More preferably, the switch 88 may be replaced or supplemented by a controller 90 and at least one sensor 92 communicatively coupled to the controller 90 (FIG. 10*a*). The controller 90 and sensor(s) 92 are cooperatively configured to selectively cause actuation when a pre-determined condition is detected. For example, it is envisioned that at least one vehicle crash sensor 92 may be employed, such that the controller 90 is able to detect an actual and/or predict an imminent crash event. In this configuration, the controller 90 causes the support 10 to actuate (so as to cause the surface 16 to recess) only when the event is determined, and preferably overrides the input device 88. In crash settings, it is appreciated that fast acting materials, such as SMA, are preferably employed; and an overload protector 52 is preferably omitted, so that the maximum generated actuation force is attainable by the wire 14.

In another example, at least one load cell sensor 92 may be utilized in association with the seat upright 12*a*. In this configuration, the support 10 is autonomously manipulated upon application and/or removal of a minimum force (e.g., the resting load of the average child occupant). It is appreciated that suitable algorithms, processing capability, and sensor selection/inputs are well within the skill of those in the art in view of this disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A manipulable lumbar support adapted for use with a seat upright, wherein the upright defines an engagement surface, and the surface presents a first condition, said support comprising:

a reconfigurable structure for being disposed within the upright, and presenting a first position, configuration, and orientation relative to the surface; and an actuator drivenly coupled to the structure and including at least one active material element operable to undergo a reversible change when exposed to or occluded from an activation signal, wherein the element is comprised of shape memory alloy, electro-active polymers, piezoelectric composites, magneto-restrictive, electro-restrictive material or a combination of the foregoing materials said actuator being configured to cause or enable the structure to achieve to a second position, configuration, or orientation, wherein the condition is modified, as a result of the change, wherein said at least one element includes a shape memory alloy wire, the structure includes at least one set of lateral stirrups presenting a longitudinally overlapping area in a first cooperative configuration, the actuator is drivenly coupled to the stirrups and configured to cause them to inwardly translate to a second cooperative configuration, wherein the area is increased, as a result of the change.

2. The support as claimed in claim 1, wherein the stirrups are bowed, so as to present a spring bias towards the first configuration.

3. The support as claimed in claim 1, wherein at least one ball-detent locking mechanism is configured to engage, so as to retain, the stirrups in the second configuration, when engaged, and the element is further configured to disengage the mechanism, as a result of the change.

4. The support as claimed in claim 1, wherein the stirrups are vertically translatable, and drivenly coupled to a second actuator.

5. A manipulable lumbar support adapted for use with a seat upright, wherein the upright defines an engagement surface, and the surface presents a first condition, said support comprising:

a reconfigurable structure for being disposed within the upright, and presenting a first position, configuration, and orientation relative to the surface; and an actuator drivenly coupled to the structure and including at least one active material element operable to undergo a reversible change when exposed to or occluded from an activation signal, said actuator being configured to cause or enable the structure to achieve to a second position, configuration, or orientation, wherein the condition is modified, as a result of the change, wherein the structure includes first and second sliding blocks entrained by a lateral frame member and defining a first spacing, and a floater pad intermediate the surface and blocks, the actuator is operable to cause the blocks to relatively translate so as to define a second spacing, and the second spacing causes the pad to modify the condition.

6. The support as claimed in claim 5, wherein the blocks are biased towards the first or second spacing by at least one spring.

7. A manipulable lumbar support adapted for use with a seat upright, wherein the upright defines an engagement surface, and the surface presents a first condition, said support comprising:
- a reconfigurable structure for being disposed within the upright, and presenting a first position, configuration, and orientation relative to the surface; and
- an actuator drivenly coupled to the structure and including at least one active material element operable to undergo a reversible change when exposed to or occluded from an activation signal,
- said actuator being configured to cause or enable the structure to achieve to a second position, configuration, or orientation, wherein the condition is modified, as a result of the change,
- wherein the structure includes at least one flexible member, and the actuator is configured to cause the member to achieve the second configuration, as a result of the change,
- wherein the actuator includes a shape memory alloy wire medially coupled to said at least one member, and entrained by first and second laterally spaced pulleys, so that the wire is caused to contract and the center of the member to recess, as a result of the change.

8. The support as claimed in claim 7, further comprising a locking mechanism including first and second displaceable blocks, wherein the blocks are configured to selectively engage the wire, so as to retain the structure in the second configuration.

9. The support as claimed in claim 8, wherein the blocks are spring biased towards engagement with the wire.

10. A manipulable lumbar support adapted for use with a seat upright, wherein the upright defines an engagement surface, and the surface presents a first condition, said support comprising:
- a reconfigurable structure for being disposed within the upright, and presenting a first position, configuration, and orientation relative to the surface; and
- an actuator drivenly coupled to the structure and including at least one active material element operable to undergo a reversible change when exposed to or occluded from an activation signal,
- said actuator being configured to cause or enable the structure to achieve to a second position, configuration, or orientation, wherein the condition is modified, as a result of the change,
- wherein the structure includes at least one flexible member, and the actuator is configured to cause the member to achieve the second configuration, as a result of the change,
- wherein the actuator includes a cam, the active material element is operable to cause the cam to rotate as a result of the change, and the rotation of the cam causes the structure to achieve the second configuration.

11. The support as claimed in claim 10, wherein the actuator further includes a torsion bar entraining, so as to define a pivot axis with, the cam, and operable to generate a biasing force towards the first configuration, when the active material element is caused to change.

12. A manipulable lumbar support adapted for use with a seat upright, wherein the upright defines an engagement surface, and the surface presents a first condition, said support comprising:
- a reconfigurable structure for being disposed within the upright, and presenting a first position, configuration, and orientation relative to the surface; and
- an actuator drivenly coupled to the structure and including at least one active material element operable to undergo a reversible change when exposed to or occluded from an activation signal,
- said actuator being configured to cause or enable the structure to achieve to a second position, configuration, or orientation, wherein the condition is modified, as a result of the change,
- wherein the structure includes at least one flexible member, and the actuator is configured to cause the member to achieve the second configuration, as a result of the change,
- wherein the actuator includes first and second sliders entraining said at least one flexible member, and drivenly coupled to said at least one active material element, such that the sliders are caused to relatively translate as a result of the change, and the member is enabled to achieve the second configuration as a result of the translation.

13. The support as claimed in claim 12, wherein the sliders are drivenly coupled to a plurality of separately activated shape memory wires, so as to cooperatively present a plurality of support positions.

14. The support as claimed in claim 1, wherein the actuator includes a plurality of autonomously functioning elements, each element is drivenly coupled to a separate portion of the structure, and the elements are cooperatively configured to sequentially displace the portions.

15. The support as claimed in claim 14, wherein the structure is drivenly coupled to a plurality of piezoelectric elements, and the elements and structure are cooperatively configured to produce a standing or traveling wave in the surface.

16. The support as claimed in claim 1, further comprising a locking mechanism configured to engage, so as to retain, the structure when in the second position, configuration or orientation, when the change is reversed.

17. The support as claimed in claim 16, wherein the mechanism includes a second active material element operable to undergo a second change when exposed to an activation signal, and configured to cause the mechanism to disengage the structure, as a result of the change.

18. The support as claimed in claim 1, further comprising a return mechanism drivenly coupled to the structure antagonistically to the actuator, and producing a biasing force less than the actuation force, such that the mechanism causes the structure to move to the first position when the element is deactivated and allows the actuator to drive the structure to the second position when the element is activated.

19. The support as claimed in claim 1, wherein the actuator further includes an overload protector connected to the element opposite the structure, and configured to present a secondary work output path, when the element is activated and the structure is unable to be moved.

* * * * *